US012385143B2

(12) United States Patent
Scholz et al.

(10) Patent No.: US 12,385,143 B2
(45) Date of Patent: Aug. 12, 2025

(54) CORROSION INHIBITOR FOR MITIGATING ALKALINE CARBONATE STRESS CORROSION CRACKING

(71) Applicant: Ecolab USA Inc., St. Paul, MN (US)

(72) Inventors: John Nathan Scholz, Sugar Land, TX (US); Philip Andrew Thornthwaite, Wigan (GB); Janelle Leigh Pennington, Missouri City, TX (US); Maria DeJesus Marquez, Houston, TX (US); Oussama Zenasni, Houston, TX (US)

(73) Assignee: Ecolab USA Inc., St. Paul, MN (US)

( * ) Notice: Subject to any disclaimer, the term of this patent is extended or adjusted under 35 U.S.C. 154(b) by 159 days.

(21) Appl. No.: 17/817,890

(22) Filed: Aug. 5, 2022

(65) Prior Publication Data

US 2023/0053403 A1     Feb. 23, 2023

Related U.S. Application Data (60) Provisional application No. 63/203,963, filed on Aug. 5, 2021.

(51) Int. Cl.
*C23F 11/14*     (2006.01)
*C09K 8/54*     (2006.01)
(Continued)

(52) U.S. Cl.
CPC .............. *C23F 11/149* (2013.01); *C09K 8/54* (2013.01); *C10G 75/02* (2013.01); *C23F 11/10* (2013.01); *C23F 11/143* (2013.01); *C23F 11/173* (2013.01)

(58) Field of Classification Search
None
See application file for complete search history.

(56) References Cited

U.S. PATENT DOCUMENTS 2,262,738 A * 11/1941 De Groote ............... C09K 8/74
564/462
2,290,414 A * 7/1942 De Groote ............... C09K 8/74
507/921

(Continued)

FOREIGN PATENT DOCUMENTS

CN    104673471 A    6/2015
EP    0 526 251 A1   2/1993
(Continued)

OTHER PUBLICATIONS

International Search Report and Written Opinion dated Oct. 31, 2022 relating to PCT/US2022/039530, 11 pages.
(Continued)

*Primary Examiner* — Joseph D Anthony
(74) *Attorney, Agent, or Firm* — Stinson LLP (57) ABSTRACT

Compounds, compositions and methods are provided for reducing, inhibiting, or preventing corrosion of a surface, using a corrosion-inhibiting composition comprising a dispersant having the structure of Formula 1 and a corrosion inhibitor having the structure of Formula 2

(Continued)

-continued

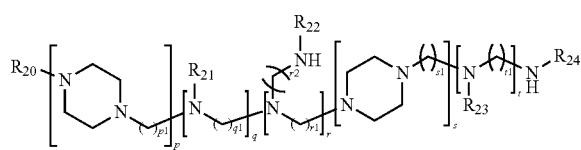

(2)

wherein $X_1$ is hydroxyl, —OC(O)$R_1$; $X_2$ is hydroxyl, or —OC(O)$R_2$; $X_3$ is hydroxyl or —OC(O)$R_3$; $R_1$, $R_2$, and $R_3$ are independently $C_{10}$ to $C_{30}$ alkyl or alkenyl; m, n, and o are independently integers from 1 to 10; $R_{20}$, $R_{21}$, $R_{22}$, $R_{23}$, and $R_{24}$ are independently hydrogen or —C(O)—$R_{31}$; $R_{31}$ is $C_{10}$ to $C_{30}$ alkyl or alkenyl; p is an integer of 0 or 1; q is an integer of 1 to 4; r is an integer of 0 or 1; s is an integer of 0 or 1; t is an integer from 1 to 4; and p1, q1, r1, r2, s1, and t1 are independently integers from 1 to 6; wherein when p, r, and s are 0, q+t is an integer from 4 to 8 and at least one of $R_{20}$, $R_{21}$, $R_{22}$, $R_{23}$, and $R_{24}$ is —C(O)—$R_{31}$.

19 Claims, 2 Drawing Sheets (51) Int. Cl.
*C10G 75/02* (2006.01)
*C23F 11/10* (2006.01)
*C23F 11/173* (2006.01)

(56) References Cited

U.S. PATENT DOCUMENTS

| | | | |
|---|---|---|---|
| 2,598,213 A | 5/1952 | Blair, Jr. | |
| 3,247,094 A | 4/1966 | Dajani | |
| 3,458,453 A | 7/1969 | Kautsky | |
| 3,819,328 A | 6/1974 | Go | |
| 4,344,861 A | 8/1982 | Levy | |
| 4,842,716 A | 6/1989 | Kaplan et al. | |
| 5,151,220 A | 9/1992 | Majestic et al. | |
| 5,174,957 A | 12/1992 | McCullough | |
| 5,322,630 A | 6/1994 | Williams et al. | |
| 5,415,805 A | 5/1995 | Brown et al. | |
| 5,427,999 A | 6/1995 | Clewlow et al. | |
| 5,851,377 A | 12/1998 | Bush | |
| 6,063,334 A | 5/2000 | Naraghi | |
| 6,548,016 B1 | 4/2003 | Borgard | |
| 9,290,584 B2 | 3/2016 | Ng et al. | |
| 9,382,467 B2 | 7/2016 | Meyer et al. | |
| 9,434,911 B2 | 9/2016 | Bennett et al. | |
| 9,534,300 B2 | 1/2017 | Gill et al. | |
| 10,604,710 B2 | 3/2020 | Moloney | |
| 10,745,345 B2 * | 8/2020 | Khanlari | C07C 231/02 |
| 10,752,827 B2 * | 8/2020 | Skriba | C09K 8/607 |
| 11,186,540 B2 * | 11/2021 | Khanlari | C10G 75/04 |
| 2013/0302210 A1 | 11/2013 | Patel et al. | |
| 2014/0034003 A1 | 2/2014 | Corradi et al. | |
| 2014/0128294 A1 | 5/2014 | Gatlin et al. | |
| 2016/0114338 A1 | 4/2016 | Snead | |
| 2017/0342310 A1 | 11/2017 | Obeyesekere et al. | |
| 2018/0244605 A1 | 8/2018 | Khanlari et al. | |
| 2019/0062187 A1 | 2/2019 | Dhawan et al. | |
| 2019/0203131 A1 | 7/2019 | Yu et al. | |
| 2019/0316030 A1 * | 10/2019 | Skriba | E21B 43/26 |

FOREIGN PATENT DOCUMENTS

| | | |
|---|---|---|
| EP | 0 593 294 A1 | 4/1994 |
| EP | 1 043 423 A2 | 10/2000 |
| GB | 866408 | 4/1961 |
| GB | 1410788 | 10/1975 |
| WO | 2014/178737 A1 | 11/2014 |
| WO | 2019/066911 A1 | 4/2019 |
| WO | 2020/046967 A1 | 3/2020 |

OTHER PUBLICATIONS

International Search Report and Written Opinion dated Nov. 4, 2022 relating to PCT/US2022/039542, 14 pages.

* cited by examiner

CORROSION INHIBITOR FOR MITIGATING ALKALINE CARBONATE STRESS CORROSION CRACKING

CROSS REFERENCE TO RELATED APPLICATIONS

This application claims priority to U.S. Provisional Patent Application Ser. No. 63/203,963 filed on Aug. 5, 2021, the disclosure of which is incorporated herein by reference in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

FIELD OF THE INVENTION

Compounds, compositions, and methods are provided for reducing, inhibiting, or preventing corrosion of a surface, using a corrosion-inhibiting composition comprising a dispersant having the structure of Formula 1 and a corrosion inhibitor having the structure of Formula 2.

BACKGROUND OF THE INVENTION

Intergranular cracking and failure of carbon steel piping and vessels made of carbon steel occurs in various refinery overhead streams or other systems. These systems that are subject to stress corrosion cracking include hydrogen sulfide, ammonia, carbon dioxide, water, and/or hydrogen cyanide in contact with the carbon steel. The presence of these chemicals appears to contribute to carbonate stress corrosion cracking (hereafter carbonate SCC). This carbonate SCC occurrence can put the refinery operations where it is occurring at risk and can cause dangerous and hazardous conditions of instability of operations.

A particular problem observed that is related to intergranular carbonate SCC and failure of carbon steel either in piping or vessel construction, is in steel piping and vessels contained in a fluid cracking catalyst fractionator overhead system, where ammonia, hydrogen sulfide, carbon dioxide, hydrogen cyanide and water is present.

This type of carbonate SCC is different from hydrogen blistering or hydrogen induced cracking because the microscopic examination of the cracks indicates the presence of iron oxides which are not present when hydrogen blistering and/or hydrogen induced cracking is present.

Although there exist several potential approaches for controlling hydrogen induced cracking and hydrogen blistering, there are no known solutions for carbonate SCC. Therefore, a continuing need exists to provide agents for mitigating carbonate SCC.

BRIEF SUMMARY OF THE INVENTION

Disclosed herein are corrosion-inhibiting compositions and methods comprising a dispersant having the structure of Formula 1 and a corrosion inhibitor having the structure of Formula 2:

wherein $X_1$ is hydroxyl or —OC(O)$R_1$; $X_2$ is hydroxyl or —OC(O)$R_2$; $X_3$ is hydroxyl or —OC(O)$R_3$; $R_1$, $R_2$, and $R_3$ are independently $C_{10}$ to $C_{30}$ alkyl or alkenyl; m, n, and o are independently integers from 1 to 10; $R_{20}$, $R_{21}$, $R_{22}$, $R_{23}$, and $R_{24}$ are independently hydrogen or —C(O)—$R_{31}$; $R_{31}$ is $C_{10}$ to $C_{30}$ alkyl or alkenyl; p is an integer of 0 or 1; q is an integer of 1 to 4; r is an integer of 0 or 1; s is an integer of 0 or 1; t is an integer from 1 to 4; and p1, q1, r1, r2, s1, and t1 are independently integers from 1 to 6; wherein when p, r, and s are 0, q+t is an integer from 4 to 8 and at least one of $R_{20}$, $R_{21}$, $R_{22}$, $R_{23}$, and $R_{24}$ is —C(O)—$R_{31}$.

The compositions have a dispersant of Formula 1 having m, n, and o are independently integers from 1 to 8; preferably, m, n, and o are independently integers from 1 to 6; more preferably, m, n, and o are independently integers from 2 to 6; even more preferably, m, n, and o are independently integers from 2 to 4; more preferably, m, n, and o are independently integers of 2 or 3; most preferably, m, n, and o are 2.

The compositions have a dispersant of Formula 1 having $X_1$ of hydroxyl or —OC(O)$R_1$; preferably, $X_1$ of hydroxyl; alternatively, $X_1$ of —OC(O)$R_1$.

Compositions and methods described herein have a dispersant of Formula 1 having $R_1$ of $C_{12}$ to $C_{24}$ alkyl or alkenyl; preferably, $R_1$ of $C_{14}$ to $C_{22}$ alkyl or alkenyl; more preferably, $R_1$ of $C_{16}$ to $C_{20}$ alkyl or alkenyl.

Additionally, the compositions and methods have a dispersant of Formula 1 having $X_2$ is hydroxyl or —OC(O)$R_2$; preferably, $X_2$ is hydroxyl; alternatively, $X_2$ is —OC(O)$R_2$.

The compositions and methods have a dispersant of Formula 1 having $R_2$ of $C_{12}$ to $C_{24}$ alkyl or alkenyl; preferably, $R_2$ of $C_{14}$ to $C_{22}$ alkyl or alkenyl; more preferably, $R_2$ of $C_{16}$ to $C_{20}$ alkyl or alkenyl.

Yet further, the compositions and methods have a dispersant of Formula 1 having $X_3$ of hydroxyl or —OC(O)$R_3$; preferably, $X_3$ of hydroxyl; alternatively, $X_3$ of —OC(O)$R_3$.

The dispersant of Formula 1 has $R_3$ of $C_{12}$ to $C_{24}$ alkyl or alkenyl; preferably, $R_3$ of $C_{14}$ to $C_{22}$ alkyl or alkenyl; more preferably, $R_3$ of $C_{16}$ to $C_{20}$ alkyl or alkenyl.

In particular, the dispersant of Formula 1 has the structure of Formula 1A:

(1A)

The corrosion inhibitor of Formula 2 has a structure wherein p1, q1, r1, r2, s1, and t1 are independently integers from 2 to 6; preferably, p1, q1, r1, r2, s1, and t1 are independently integers from 2 to 4; more preferably, p1, q1, r1, r2, s1, and t1 are independently integers of 2 or 3; most preferably, p1, q1, r1, r2, s1, and t1 are an integer of 2.

The corrosion inhibitor of Formula 2 has the structure of Formula 2A:

(2A)

The corrosion inhibitor of Formula 2 and 2A has a structure wherein $R_{31}$ is $C_{12}$ to $C_{24}$ alkyl or alkenyl; preferably, wherein $R_{31}$ is $C_{14}$ to $C_{22}$ alkyl or alkenyl; more preferably, wherein $R_{31}$ is $C_{16}$ to $C_{20}$ alkyl or alkenyl.

The corrosion-inhibiting composition comprising a dispersant of Formula 1 and a corrosion inhibitor of Formula 2 can further comprise a solvent. Suitable solvents are water, brine, seawater, alcohols such as methanol, ethanol, isopropanol, n-propanol, n-butanol, isobutanol, sec-butanol, t-butanol or higher alcohols such as benzyl alcohol); ketones such as acetone, or methyl ethyl ketone (2-butanone); acetonitrile; esters such as ethyl acetate, propyl acetate and butyl acetate; ethers such as diethyl ether or higher, e.g. methyl t-butyl ether, glyme, diglyme, ethylene glycol monobutyl ether, ethylene diglycol ethyl ether, 1,4-dioxane and related; aromatics such as toluene, xylene(s), diethylbenzene, naphthalene, and related aromatics or refinery cuts (heavy aromatic naphtha, heavy aromatic distillates, and related); aliphatics such as pentane, hexane, heptane, octane, or refined gasoline; or several "green" solvents such as 2-methyltetrahydrofuran, furfural alcohol, and cyclopentylmethylether.

Additionally, the solvents suitable for formulation are aliphatic, such as pentane, hexane, cyclohexane, methylcyclohexane, heptane, decane, dodecane, and the like, and aromatics, such as toluene, xylene, heavy aromatic naphtha, diesel, fatty acid derivatives (acids, esters, amides), and the like. Preferably, the solvent is a hydrocarbon solvent. More preferably, the hydrocarbon solvent can comprise heavy aromatic naphtha, toluene, xylene(s), diethylbenzene, and naphthalene, or a combination thereof.

The corrosion-inhibiting compositions described herein can form a film on a surface.

The corrosion-inhibiting compositions can be used in methods of inhibiting corrosion by contacting the corrosion-inhibiting composition with a surface in contact with an aqueous medium comprising hydrogen sulfide, ammonia, carbon dioxide, hydrogen cyanide, carbonate, bicarbonate, or a combination thereof.

Preferably, in the methods of inhibiting corrosion, the aqueous medium comprises carbonate, bicarbonate, or a combination thereof.

Additionally, in the methods of inhibiting corrosion described herein, the surface is a metal surface. In particular, the metal surface comprises carbon steel.

In the methods of inhibiting corrosion described herein, the corrosion-inhibiting compositions can protect the metal surface by forming a barrier between the metal and the corrosive media.

Additionally, in the methods of inhibiting corrosion described herein, the surface is contained in a fluid catalytic cracking unit (FCCU) or sour water stripper (SWS).

For these corrosion inhibition methods, the corrosion-inhibiting composition is contacted with the surface at a concentration of 1 to 1000 ppm based on the process vapor flow, i.e. overhead flow of a FCC main fractionator; preferably, the corrosion-inhibiting composition is contacted with the surface at a concentration of 1 to 1000 ppm.

Other objects and features will be in part apparent and in part pointed out hereinafter.

DETAILED DESCRIPTION OF THE INVENTION

Described herein are corrosion-inhibiting compositions comprising a mixture of a dispersant and a filming corrosion inhibitor to mitigate stress corrosion cracking (SCC) in refinery processes, particularly in environments having a high carbonate ($CO_3^{2-}$) concentration. The disclosed blend is composed of a mixture of a dispersant of Formula 1 and a corrosion inhibitor of Formula 2. The corrosion-inhibiting composition can protect the metal surface against carbonate SCC and other corrosion mechanisms.

Compounds, compositions, and methods are provided for reducing, inhibiting, or preventing corrosion of a surface, using a corrosion-inhibiting composition comprising a dispersant having the structure of Formula 1 and a corrosion inhibitor having the structure of Formula 2.

a dispersant having the structure of Formula 1 and a corrosion inhibitor having the structure of Formula 2:

(1)

(2)

wherein $X_1$ is hydroxyl or —OC(O)$R_1$; $X_2$ is hydroxyl or —OC(O)$R_2$; $X_3$ is hydroxyl or —OC(O)$R_3$; $R_1$, $R_2$, and $R_3$ are independently $C_{10}$ to $C_{30}$ alkyl or alkenyl; m, n, and o are independently integers from 1 to 10; $R_{20}$, $R_{21}$, $R_{22}$, $R_{23}$, and $R_{24}$ are independently hydrogen or —C(O)—$R_{31}$; $R_{31}$ is $C_{10}$ to $C_{30}$ alkyl or alkenyl; p is an integer of 0 or 1; q is an integer of 1 to 4; r is an integer of 0 or 1; s is an integer of 0 or 1; t is an integer from 1 to 4; and p1, q1, r1, r2, s1, and t1 are independently integers from 1 to 6; wherein when p, r, and s are 0, q+t is an integer from 4 to 8 and at least one of $R_{20}$, $R_{21}$, $R_{22}$, $R_{23}$, and $R_{24}$ is —C(O)—$R_{31}$.

The compositions have a dispersant of Formula 1 having m, n, and o are independently integers from 1 to 8; preferably, m, n, and o are independently integers from 1 to 6; more preferably, m, n, and o are independently integers from 2 to 6; even more preferably, m, n, and o are independently integers from 2 to 4; more preferably, m, n, and o are independently integers of 2 or 3; most preferably, m, n, and o are 2.

The compositions have a dispersant of Formula 1 having $X_1$ of hydroxyl or —OC(O)$R_1$; preferably, $X_1$ of hydroxyl; alternatively, $X_1$ of —OC(O)$R_1$.

Compositions and methods described herein have a dispersant of Formula 1 having $R_1$ of $C_{12}$ to $C_{24}$ alkyl or alkenyl; preferably, $R_1$ of $C_{14}$ to $C_{22}$ alkyl or alkenyl; more preferably, $R_1$ of $C_{16}$ to $C_{20}$ alkyl or alkenyl.

Additionally, the compositions and methods have a dispersant of Formula 1 having $X_2$ is hydroxyl or —OC(O)$R_2$; preferably, $X_2$ is hydroxyl; alternatively, $X_2$ is —OC(O)$R_2$.

The compositions and methods have a dispersant of Formula 1 having $R_2$ of $C_{12}$ to $C_{24}$ alkyl or alkenyl; preferably, $R_2$ of $C_{14}$ to $C_{22}$ alkyl or alkenyl; more preferably, $R_2$ of $C_{16}$ to $C_{20}$ alkyl or alkenyl.

Yet further, the compositions and methods have a dispersant of Formula 1 having $X_3$ of hydroxyl or —OC(O)$R_3$; preferably, $X_3$ of hydroxyl; alternatively, $X_3$ of —OC(O)$R_3$.

The dispersant of Formula 1 has $R_3$ of $C_{12}$ to $C_{24}$ alkyl or alkenyl; preferably, $R_3$ of $C_{14}$ to $C_{22}$ alkyl or alkenyl; more preferably, $R_3$ of $C_{16}$ to $C_{20}$ alkyl or alkenyl.

In particular, the dispersant of Formula 1 has the structure of Formula 1A:

(1A)

The corrosion inhibitor of Formula 2 has a structure wherein p1, q1, r1, r2, s1, and t1 are independently integers from 2 to 6; preferably, p1, q1, r1, r2, s1, and t1 are independently integers from 2 to 4; more preferably, p1, q1, r1, r2, s1, and t1 are independently integers of 2 or 3; most preferably, p1, q1, r1, r2, s1, and t1 are an integer of 2.

The corrosion inhibitor of Formula 2 has the structure of Formula 2A:

(2A)

The corrosion inhibitor of Formula 2 or 2A has a structure wherein $R_{31}$ is $C_{12}$ to $C_{24}$ alkyl or alkenyl; preferably, wherein $R_{31}$ is $C_{14}$ to $C_{22}$ alkyl or alkenyl; more preferably, wherein $R_{31}$ is $C_{16}$ to $C_{20}$ alkyl or alkenyl.

The corrosion-inhibiting composition comprising a dispersant of Formula 1 and a corrosion inhibitor of Formula 2 can further comprise a solvent. Suitable solvents are water, brine, seawater, alcohols such as methanol, ethanol, isopropanol, n-propanol, n-butanol, isobutanol, sec-butanol, t-butanol or higher alcohols such as benzyl alcohol); ketones such as acetone, or methyl ethyl ketone (2-butanone); acetonitrile; esters such as ethyl acetate, propyl acetate and butyl acetate; ethers such as diethyl ether or higher, e.g. methyl t-butyl ether, glyme, diglyme, ethylene glycol monobutyl ether, ethylene diglycol ethyl ether, 1,4-dioxane and related; aromatics such as toluene, xylene(s), diethylbenzene, naphthalene, and related aromatics or refinery cuts (heavy aromatic naphtha, heavy aromatic distillates, and related); aliphatics such as pentane, hexane, heptane, octane, or refined gasoline; or several "green" solvents such as 2-methyltetrahydrofuran, furfural alcohol, and cyclopentylmethylether.

The solvents suitable for formulation are aliphatic, such as pentane, hexane, cyclohexane, methylcyclohexane, heptane, decane, dodecane, and the like, and aromatics, such as toluene, xylene, heavy aromatic naphtha, diesel, fatty acid derivatives (acids, esters, amides), and the like. Preferably, the solvent is a hydrocarbon solvent. More preferably, the hydrocarbon solvent can comprise heavy aromatic naphtha, xylene, or a combination thereof.

The corrosion-inhibiting composition comprises a dispersant of Formula 1 in a concentration of from about 10 wt. % to about 70 wt. %, a corrosion inhibitor of Formula 2 in a concentration of from about 5 wt. % to about 40 wt. %, and the remainder of the composition being a solvent, based on the total weight of the dispersant of Formula 1, the corrosion inhibitor of Formula 2, and the solvent.

The corrosion-inhibiting composition can comprise a dispersant of Formula 1 in a concentration of from about 10 wt. % to about 70 wt. %, from about 10 wt. % to about 65 wt. %, from about 10 wt. % to about 60 wt. %, from about 10 wt. % to about 55 wt. %, from about 10 wt. % to about 50 wt. %, from about 10 wt. % to about 45 wt. %, from about 10 wt. % to about 40 wt. %, from about 15 wt. % to about 70 wt. %, from about 15 wt. % to about 65 wt. %, from about 15 wt. % to about 60 wt. %, from about 15 wt. % to about 55 wt. %, from about 15 wt. % to about 50 wt. %, from about 15 wt. % to about 45 wt. %, from about 15 wt. % to about 40 wt. %, from about 20 wt. % to about 70 wt. %, from about 20 wt. % to about 65 wt. %, from about 20 wt. % to about 60 wt. %, from about 20 wt. % to about 55 wt. %, from about 20 wt. % to about 50 wt. %, from about 20 wt. % to about 45 wt. %, from about 20 wt. % to about 40 wt. %, from about 25 wt. % to about 70 wt. %, from about 25 wt. % to about 65 wt. %, from about 25 wt. % to about 60 wt. %, from about 25 wt. % to about 55 wt. %, from about 25 wt. % to about 50 wt. %, from about 25 wt. % to about 45 wt. %, from about 25 wt. % to about 40 wt. %, from about 30 wt. % to about 70 wt. %, from about 30 wt. % to about 65 wt. %, from about 30 wt. % to about 60 wt. %, from about 30 wt. % to about 55 wt. %, from about 30 wt. % to about 50 wt. %, from about 30 wt. % to about 45 wt. %, from about 30 wt. % to about 40 wt. %, from about 35 wt. % to about 70 wt. %, from about 35 wt. % to about 65 wt. %, from about 35 wt. % to about 60 wt. %, from about 35 wt. % to about 55 wt. %, from about 35 wt. % to about 50 wt. %, from about 35 wt. % to about 45 wt. %, or from about 35 wt. % to about 40 wt. %.

The corrosion-inhibiting composition can comprise a corrosion inhibitor of Formula 2 in a concentration of from about 5 wt. % to about 40 wt. %, from about 5 wt. % to about 35 wt. %, from about 5 wt. % to about 30 wt. %, from about 5 wt. % to about 25 wt. %, from about 5 wt. % to about 20 wt. %, from about 10 wt. % to about 40 wt. %, from about 10 wt. % to about 35 wt. %, from about 10 wt. % to about 30 wt. %, from about 10 wt. % to about 25 wt. %, from about 10 wt. % to about 20 wt. %, from about 15 wt. % to about 40 wt. %, from about 15 wt. % to about 35 wt. %, from about 15 wt. % to about 30 wt. %, from about 15 wt. % to about 25 wt. %, or from about 15 wt. % to about 20 wt. %.

The corrosion-inhibiting composition can comprise a solvent in a concentration of from about 5 wt. % to about 40 wt. %, from about 5 wt. % to about 35 wt. %, from about 5 wt. % to about 30 wt. %, from about 5 wt. % to about 25 wt. %, from about 5 wt. % to about 20 wt. %, from about 10 wt. % to about 40 wt. %, from about 10 wt. % to about 35 wt. %, from about 10 wt. % to about 30 wt. %, from about 10 wt. % to about 25 wt. %, from about 10 wt. % to about 20 wt. %, from about 15 wt. % to about 40 wt. %, from about 15 wt. % to about 35 wt. %, from about 15 wt. % to about 30 wt. %, from about 15 wt. % to about 25 wt. %, or from about 15 wt. % to about 20 wt. %.

Preferably, the corrosion-inhibiting composition comprises 40 wt. % of a dispersant of Formula 1, 20 wt. % of the corrosion inhibitor of Formula 2, and 20 wt. % of a solvent.

The corrosion-inhibiting compositions described herein can form a film on a surface.

The corrosion-inhibiting compositions can be used in methods of inhibiting corrosion by contacting the corrosion-inhibiting composition with a surface in contact with an aqueous medium comprising hydrogen sulfide, ammonia, carbon dioxide, hydrogen cyanide, carbonate, bicarbonate, or a combination thereof.

Preferably, in the methods of inhibiting corrosion, the aqueous medium comprises carbonate, bicarbonate, or a combination thereof.

Additionally, in the methods of inhibiting corrosion described herein, the surface is a metal surface. In particular, the metal surface comprises carbon steel.

In the methods of inhibiting corrosion described herein, the corrosion-inhibiting compositions can form a protective layer between the metal surface and the corrosive media.

Additionally, in the methods of inhibiting corrosion described herein, the surface is contained in a fluid catalytic cracking unit (FCCU) and sour water stripper (SWS).

It is preferable that the effective amount of the corrosion-inhibiting compositions are at dosages which provide for anywhere from 1 ppm to about 1,000 ppm active compounds based on the total amount of refinery streams being treated by these compositions. Preferably the dosage ranges from about 2 to about 500 ppm active ingredient based on the refinery stream being treated, and most preferably the dosage range from about 5 to about 150 ppm.

To obtain optimum results, it is preferred to add the above dosages at the higher end initially and then maintenance dosages can be dropped to the lower end of the concentration mentioned above. As an example, a system would be expected to be optimized by treating with approximately 250-500 ppm of the active compounds in the corrosion-inhibiting compositions based on refinery stream being treated, for the initial 24-72 hours of operation. Thereafter, the dosage treatment rate would be effectively dropped over a period of from 1 to about 10 days to a maintenance level ranging between from about 1 ppm to about 100 ppm, preferably from about 5 to about 50 ppm of the actives in the composition, based on the refinery stream being treated.

The refinery process or streams which appear to enhance carbonate stress cracking corrosion are those processes or streams which can contain at least one or more, of the chemicals: ammonia, hydrogen cyanide, carbon dioxide, hydrogen sulfide, water, or similar compounds that are somewhat volatile. Those process streams can include, but are not necessarily limited to, process streams handling the overhead vapors and condensate liquids from a fluid catalytic cracking unit or effluent sour water treated in a sour water stripper. Particularly, it has been found that the process streams of the fluid catalytic cracking unit (FCCU) including, but not limited to, the FCCU Fractionator, any overhead condensers, fractionator reflux condensate drums/vessels, overhead accumulators, knock out drums, interstage coolers and/or condensers, deethanizers, debutanizers, depropanizers, and the like, and any pipelines, connectors, pumps and the like that can be connected with this type of operation.

The carbonate stress corrosion cracking is apparently diagnosed primarily by the presence of iron oxides in the cracks. This is compared to the reported absence of iron oxides in blisters or cracks caused by hydrogen gas invasion or hydrogen induced cracking. Therefore, carbonate stress corrosion cracking is not the same as hydrogen induced cracking or blistering, although hydrogen blistering may also be observed in these same systems, particularly when hydrogen sulfide is present in the refinery streams.

For the dispersant compound of formula 1, a hydroxylated polyamine (e.g., triethanolamine) is reacted with a carboxylic acid, RCOOH, where R can be an alkyl or alkenyl group having from 1 to 30 carbon atoms at an appropriate temperature until completion of the condensation reaction. Completion of the reaction is determined once consumption of the acid reaches a desired amount. The reaction products are then diluted in an appropriate solvent.

For the corrosion inhibitor compound of formula 2, a carboxylic acid, RCOOH, where R can be an alkyl or alkenyl group having from 1 to 30 carbon atoms is reacted with a polyamine (e.g., diethylene triamine, triethylene tetramine, tetraethylene pentamine, pentaethylene hexamine, etc.) in a suitable solvent at an appropriate temperature until completion of the reaction. Completion of the reaction is determined once consumption of the acid reaches a desired amount.

The corrosion-inhibiting composition can also further comprise one or more additional corrosion inhibitors, an organic solvent, an asphaltene inhibitor, a paraffin inhibitor, a scale inhibitor, an emulsifier, a water clarifier, a dispersant, an emulsion breaker, a gas hydrate inhibitor, a biocide, a pH modifier, a surfactant, or a combination thereof.

The corrosion-inhibiting composition described herein comprises from about 0.1 to about 20 wt. % of one or more compounds of formula 1 or 2 in a solvent system.

The organic solvent can comprise an alcohol, a hydrocarbon, a ketone, an ether, an alkylene glycol, a glycol ether, an amide, a nitrile, a sulfoxide, an ester, or any combination thereof, and the composition optionally comprises water.

Preferably, the organic solvent comprises methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, or a combination thereof.

A compound used to enhance the corrosion performance of the composition can also be included in the anticorrosion composition. For example, thioglycolic acid, 3,3'-dithiopropioinic acid, thiosuifate, thiourea, 2-mercaptoethanol, L-cysteine, tert-butyl mercaptan, or a combination thereof can be included in the anticorrosion composition.

The methods described herein can have the surface be part of equipment used in an industrial system. The industrial system can be a water recirculating system, a cooling water system, a boiler water system, a pulp slurry, a papermaking process, a ceramic slurry, a mixed solid/liquid system, or an oil-field system.

The methods described herein can have the fluid be used in the operation of the industrial system.

The fluid can comprise seawater, produced water, fresh water, brackish water, drilling fluid, completion fluid, or a combination thereof.

The corrosion-inhibiting composition can be used for inhibiting corrosion in oil and gas applications such as by treating a gas or liquid stream with an effective amount of a compound or composition as described herein. The compounds and compositions can be used in any industry where it is desirable to inhibit corrosion at a surface.

The corrosion-inhibiting composition can be used in water systems, condensate/oil systems/gas systems, or any combination thereof. For example, the corrosion-inhibiting composition can be used in controlling scale on heat exchanger surfaces.

The corrosion-inhibiting composition can be applied to a gas or liquid produced, or used in the production, transportation, storage, and/or separation of crude oil or natural gas.

A fluid to which the corrosion-inhibiting composition can be introduced can be an aqueous medium. The aqueous medium can comprise water, gas, and optionally liquid hydrocarbon.

A fluid to which the corrosion-inhibiting composition can be introduced can be a liquid hydrocarbon. The liquid hydrocarbon can be any type of liquid hydrocarbon including, but not limited to, crude oil, heavy oil, processed residual oil, bituminous oil, coker oils, coker gas oils, fluid catalytic cracker feeds, gas oil, naphtha, fluid catalytic cracking slurry, diesel fuel, fuel oil, jet fuel, gasoline, and kerosene.

The fluid or gas can be a refined hydrocarbon product.

A fluid or gas treated with a corrosion-inhibiting composition can be at any selected temperature, such as ambient temperature or an elevated temperature. The fluid (e.g., liquid hydrocarbon) or gas can be at a temperature of from about 40° C. to about 250° C. The fluid or gas can be at a temperature of from −50° C. to 300° C., 0° C to 200° C., 10° C. to 100° C., or 20° C. to 90° C. The fluid or gas can be at a temperature of 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., or 40° C. The fluid or gas can be at a temperature of 85° C., 86° C., 87° C., 88° C., 89° C., 90° C., 91° C., 92° C., 93° C., 94° C., 95° C., 96° C., 97° C., 98° C., 99° C., or 100° C.

The corrosion-inhibiting composition can be added to a fluid at various levels of water cut. For example, the water cut can be from 0% to 100% volume/volume (v/v), from 1% to 80% v/v, or from 1% to 60% v/v. The fluid can be an aqueous medium that contains various levels of salinity. The fluid can have a salinity of 0% to 25%, about 1% to 24%, or about 10% to 25% weight/weight (w/w) total dissolved solids (TDS).

The fluid or gas in which the corrosion-inhibiting compositions are introduced can be contained in and/or exposed to many different types of apparatuses.

For example, the fluid or gas can be contained in an apparatus that transports fluid or gas from one point to another, such as an oil and/or gas pipeline. The apparatus can be part of an oil and/or gas refinery, such as a pipeline, a separation vessel, a dehydration unit, or a gas line. The apparatus can be a scrubber (e.g., a wet flue gas desulfurizer, a spray dry absorber, a dry sorbent injector, a spray tower, a contact or bubble tower, or the like). The apparatus can be a cargo vessel, a storage vessel, a holding tank, or a pipeline connecting the tanks, vessels, or processing units.

The corrosion-inhibiting composition can be introduced into a fluid or gas by any appropriate method for ensuring dispersal through the fluid or gas.

The corrosion-inhibiting composition can be added to the hydrocarbon fluid before the hydrocarbon fluid contacts the surface.

The corrosion-inhibiting composition can be added at a point in a flow line upstream from the point at which corrosion prevention is desired.

The corrosion-inhibiting composition can be injected using mechanical equipment such as chemical injection pumps, piping tees, injection fittings, atomizers, quills, and the like.

The corrosion-inhibiting composition can be introduced with or without one or more additional polar or non-polar solvents depending upon the application and requirements.

The corrosion-inhibiting composition can be pumped into an oil and/or gas pipeline using an umbilical line. A capillary injection system can be used to deliver the compounds/compositions to a selected fluid.

The corrosion-inhibiting composition can be introduced into a liquid and mixed.

The corrosion-inhibiting composition can be injected into a gas stream as an aqueous or non-aqueous solution, mixture, or slurry.

The fluid or gas can be passed through an absorption tower comprising the corrosion-inhibiting composition.

The corrosion-inhibiting composition can be applied continuously, in batch, or a combination thereof. The corrosion-inhibiting composition doses can be continuous to prevent corrosion. The corrosion-inhibiting composition doses can be intermittent (i.e., batch treatment) or the corrosion-inhibiting composition doses can be continuous/maintained and/or intermittent to inhibit corrosion.

The flow rate of a flow line in which the corrosion-inhibiting composition is used can be between 0 and 100 feet per second, or between 0.1 and 50 feet per second. The corrosion-inhibiting composition can also be formulated with water in order to facilitate addition to the flow line.

The corrosion-inhibiting composition can be used for inhibiting corrosion in other applications.

The corrosion-inhibiting composition can also be used on or in other industrial equipment and in other industrial process streams such as heaters, cooling towers, boilers, retort waters, rinse waters, aseptic packaging wash waters, and the like.

The corrosion-inhibiting composition can be dispensed by immersing either intermittently or continuously in water. The composition can then dissolve, for example, at a controlled or predetermined rate. The rate can be effective to maintain a concentration of dissolved agent that is effective for use according to the methods disclosed herein.

The term "alkyl," as used herein, refers to a linear or branched hydrocarbon radical, preferably having 1 to 32 carbon atoms (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons). Alkyl groups include, but are not limited to, methyl, ethyl, n-propyl, isopropyl, n-butyl, iso-butyl, secondary-butyl, and tertiary-butyl. Alkyl groups may be unsubstituted or substituted by one or more suitable substituents, as defined above.

The term "alkenyl," as used herein, refers to a straight or branched hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon double bonds. Alkenyl groups include, but are not limited to, ethenyl, 1-propenyl, 2-propenyl (allyl), iso-propenyl, 2-methyl-1-propenyl, 1-butenyl, and 2-butenyl. Alkenyl groups may be unsubstituted or substituted by one or more suitable substituents, as defined above.

The term "alkoxy," as used herein, refers to an alkyl group, as defined herein, appended to the parent molecular moiety through an oxygen atom.

The term "aryl," as used herein, means monocyclic, bicyclic, or tricyclic aromatic radicals such as phenyl, naphthyl, tetrahydronaphthyl, indanyl and the like; optionally substituted by one or more suitable substituents, preferably 1 to 5 suitable substituents, as defined above.

The term "cycloalkyl," as used herein, refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1] heptanyl, bicyclo[3.2.1]octanyl and bicyclo[5.2.0]nonanyl, etc.); optionally containing 1 or 2 double bonds. Cycloalkyl groups may be unsubstituted or substituted by one or more suitable substituents, preferably 1 to 5 suitable substituents, as defined above.

The term "halo" or "halogen," as used herein, refers to a fluoro, chloro, bromo or iodo radical.

The term "heteroaryl," as used herein, refers to a monocyclic, bicyclic, or tricyclic aromatic heterocyclic group containing one or more heteroatoms (e.g., 1 to 3 heteroatoms) selected from O, S and N in the ring(s). Heteroaryl groups include, but are not limited to, pyridyl, pyrazinyl, pyrimidinyl, pyridazinyl, thienyl, furyl, imidazolyl, pyrrolyl, oxazolyl (e.g., 1,3-oxazolyl, 1,2-oxazolyl), thiazolyl (e.g., 1,2-thiazolyl, 1,3-thiazolyl), pyrazolyl, tetrazolyl, triazolyl (e.g., 1,2,3-trazolyl, 1,2,4-triazolyl), oxadiazolyl (e.g., 1,2,3-oxadiazolyl), thiadiazolyl (e.g., 1,3,4-thiadiazolyl), quinolyl, isoquinolyl, benzothienyl, benzofuryl, and indolyl. Heteroaryl groups may be unsubstituted or substituted by one or more suitable substituents, preferably 1 to 5 suitable substituents, as defined above.

The term "heterocycle" or "heterocyclyl," as used herein, refers to a monocyclic, bicyclic, or tricyclic group containing 1 to 4 heteroatoms selected from N, O, $S(O)_n$, $P(O)_n$, $PR_z$, NH or $NR_z$, wherein $R_z$ is a suitable substituent. Heterocyclic groups optionally contain 1 or 2 double bonds. Heterocyclic groups include, but are not limited to, azetidinyl, tetrahydrofuranyl, imidazolidinyl, pyrrolidinyl, piperidinyl, piperazinyl, oxazolidinyl, thiazolidinyl, pyrazolidinyl, thiomorpholinyl, tetrahydrothiazinyl, tetrahydrothiadiazinyl, morpholinyl, oxetanyl, tetrahydrodiazinyl, oxazinyl, oxathiazinyl, indolinyl, isoindolinyl, quinuclidinyl, chromanyl, isochromanyl, and benzoxazinyl. Examples of monocyclic saturated or partially saturated ring systems are tetrahydrofuran-2-yl, tetrahydrofuran-3-yl, imidazolidin-1-yl, imidazolidin-2-yl, imidazolidin-4-yl, pyrrolidin-1-yl, pyrrolidin-2-yl, pyrrolidin-3-yl, piperidin-1-yl, piperdin-2-yl, piperdin-3-yl, piperazin-1-yl, piperazin-2-yl, piperazin-3-yl, 1,3-oxazolidin-3-yl, isothiazolidine, 1,3-thiazolidin-3-yl, 1,2-pyrazolidin-2-yl, 1,3-pyrazolidin-1-yl, thiomorpholin-yl, 1,2-tetrahydrothiazin-2-yl, 1,3-tetrahydrothiazin-3-yl, tetrahydrothiadiazin-yl, morpholin-yl, 1,2- tetrahydrodiazin-2-yl, 1,3-tetrahydrodiazin-1-yl, 1,4-oxazin-2-yl, and 1,2,5-oxathiazin-4-yl. Heterocyclic groups may be unsubstituted or substituted by one or more suitable substituents, preferably 1 to 3 suitable substituents, as defined above.

The term "hydroxy," as used herein, refers to an —OH group.

The term "suitable substituent," as used herein, is intended to mean a chemically acceptable functional group, preferably a moiety that does not negate the activity of the inventive compounds. Such suitable substituents include, but are not limited to halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, HO—(C=O)— groups, heterocylic groups, cycloalkyl groups, amino groups, alkyl - and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, and arylsulfonyl groups. Those skilled in the art will appreciate that many substituents can be substituted by additional substituents.

Having described the invention in detail, it will be apparent that modifications and variations are possible without departing from the scope of the invention defined in the appended claims.

EXAMPLES

The following non-limiting examples are provided to further illustrate the invention.

Example 1: Synthesis of Compounds

For the dispersant compound of formula 1, a hydroxylated polyamine (e.g., triethanolamine) is reacted with a carboxylic acid, RCOOH, where R can be an alkyl or alkenyl group having from 1 to 30 carbon atoms at an appropriate temperature until completion of the condensation reaction. Completion of the reaction is determined once consumption of the acid reaches a desired amount. The reaction products are then diluted in an appropriate solvent.

For the corrosion inhibitor compound of formula 2, a carboxylic acid, RCOOH, where R can be an alkyl or alkenyl group having from 1 to 30 carbon atoms is reacted with a polyamine (e.g., diethylene triamine, triethylene tetramine, tetraethylene pentamine, pentaethylene hexamine, etc.) in a suitable solvent at an appropriate temperature until completion of the reaction. Completion of the reaction is determined once consumption of the acid reaches a desired amount.

Example 2: Corrosion Testing

The performance of the formulation was evaluated using slow strain rate (SSR) testing of C1018 carbon steel coupons. Sodium chloride (NaCl) was used in the test solution in order to hinder the re-passivation process at the crack tip and as a result, the propagation of intergranular SCC was accelerated sufficiently to occur within the timeframe of the SSR test. Table 1 summarizes the experimental conditions used in the SSR testing.

TABLE 1

Summary of Test Conditions

| Experimental Parameter | Parameter |
|---|---|
| Passivation Medium | DI Water |
| Passivation Temperature | 248° F. |
| Passivation Time | 20 Hours |
| Chloride Concentration (Cl$^-$) | 1,224 mg/L |
| Bicarbonate Concentration (HCO$_3$) | 52,750 mg/L |
| Carbonate Concentration (CO$_3$) | 12,058 mg/L |
| Starting pH | ~9.0 |
| Inhibitor Dose | 200 mg/L |
| Nitrogen Pressure | 200 psi |
| Extension Rate | $1.0 \times 10^{-6}$ in/s |
| Testing Temperature | 250° F. |

The testing was performed generally in accordance with the methodology described in NACE TM0198-2016 "Slow Strain Rate Test Method for Screening Corrosion-Resistant Alloys for Stress Corrosion Cracking in Sour Oilfield Service."

The corrosion-inhibiting composition comprises 40 wt. % of the dispersant of Formula 1, 20 wt. % of the corrosion inhibitor of Formula 2, and 20 wt. % of heavy aromatic naphtha, based on the total weight of the dispersant of Formula 1, the corrosion inhibitor of Formula 2, and the heavy aromatic naphtha. The composition provides a passivating and protecting layer on the targeted metal surface, with aid from the dispersant. The layer and the dispersant subsequently inhibit stress corrosion cracking by preventing corrosive species (i.e., carbonate and bicarbonate ions) from initiating intergranular cracking. The performance of the composition is evaluated via slow strain rate (SSR) testing of metal coupons in the presence of the formulation and the corrosive species at elevated temperature and pressure. The ductility ratios of the samples and optical micrographs of the metal coupons are used to evaluate the effectiveness of the formulation to prevent alkaline stress corrosion cracking (ASCC).

Coupon Preparation and Passivation for the SSR testing was performed as follows. AISI 1018 SSR test specimens (i.e., coupons) were machined and then removed in the longitudinal direction and prepared in accordance to NACE TM0198-2016. The coupons were degreased in a detergent solvent followed by a two-step solvent rinse in alcohol then in acetone, and air dried at room temperature. Each specimen was then assembled into a 0.5-liter Alloy C276 test vessel and pressure tested for leaks. The electrical resistance between the specimen/pull rod assembly and the vessel body was checked to ensure no electrical continuity existed. AISI 1018 SSR test specimens (with the exception of the "Inert" coupon) were pre-conditioned (passivated) in deaerated deionized water at 248° F. for 20 hours to create a magnetite layer.

The SSR Testing was performed as follows. OLI's Stream Analyzer simulation software was used to calculate the quantities of individual pure components required at standard conditions, to achieve the specified environmental conditions on heating to test temperature. A concentrated carbonate test medium (375 mL) consisting of 1,224 mg/L Cl$^-$(as sodium chloride), 52,750 mg/L HCO2, and 12,058 mg/L CO$_3^{2-}$, producing a solution pH above 9.0 was prepared. The solution was deaerated by purging with nitrogen, and the dissolved oxygen concentration was measured and recorded. After pre-conditioning the coupons, the deaerated carbonate solution was transferred into the test vessel and deaerated in-situ for a further one (1) hour. The coupon was pre-loaded to 200 lbf, the test solution was heated to 250° F., and the pressure increased to 200 psi with nitrogen gas. After the target environmental conditions were achieved, the specimen was subjected to a continuously increasing uniaxial tensile stress imposed at a constant extension rate of 1×10-6 in/s. Upon completion of each environmental test, the pH of the solution was measured at ambient conditions. The coupons were removed, cleaned, and measured to determine the reduction in the cross-sectional area. All specimens were visually examined at 20× magnification under a low-power optical microscope for any evidence of cracking.

Figure 1:
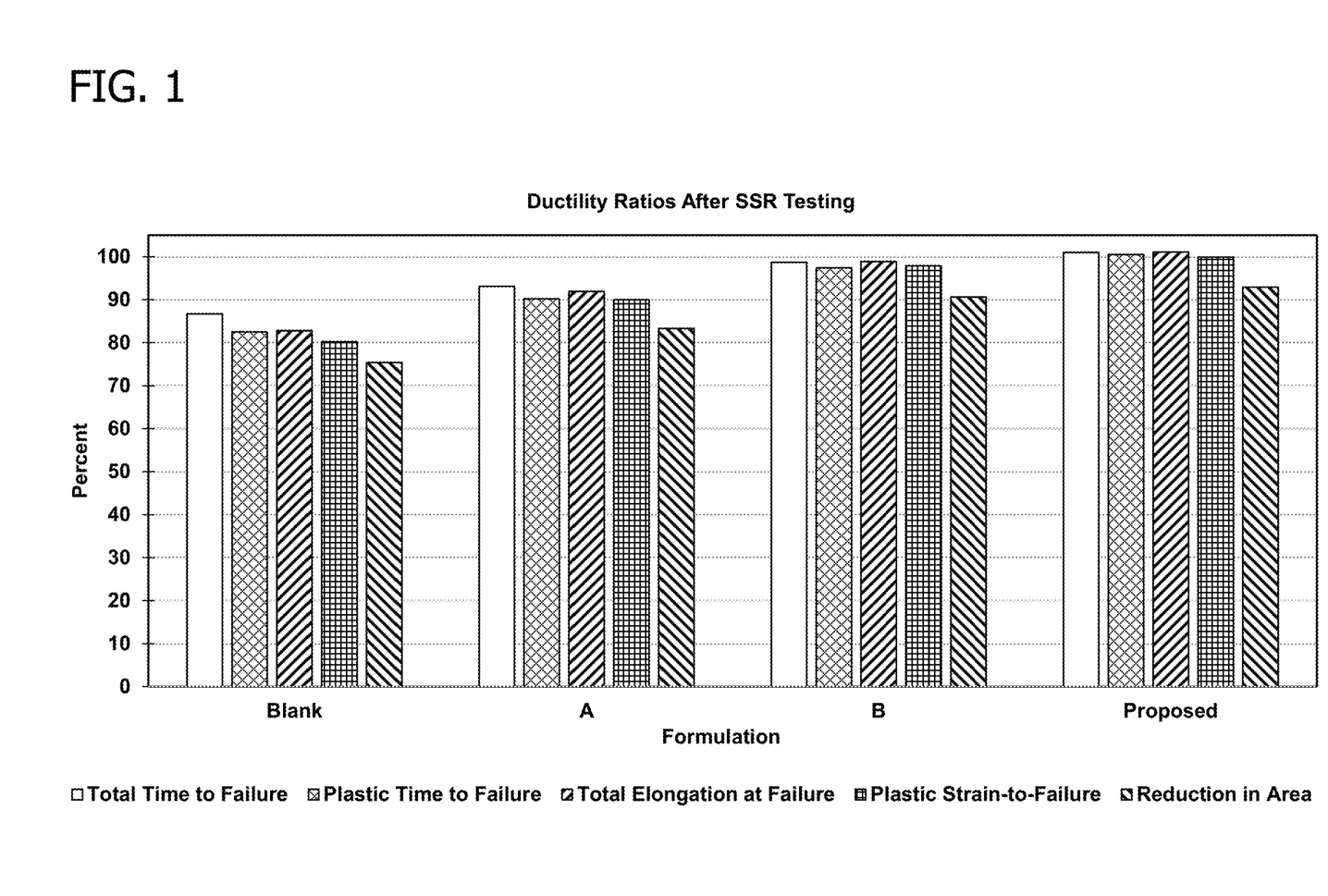
FIG. 1 is a bar graph of ductility ratios (total time to failure, plastic time to failure, total elongation at failure, plastic strain-to-failure, and reduction in area) calculated post-test of the C1018 carbon steel coupons untreated ("Blank") and treated with various formulations (e.g., Comparative Formulation A—formulation with corrosion inhibitor only (Formula 1), Comparative Formulation B—formulation with dispersant only (formula 2), and the Proposed Invention of corrosion inhibitor (formula 1) and dispersant (formula 2).
Figure 2A:
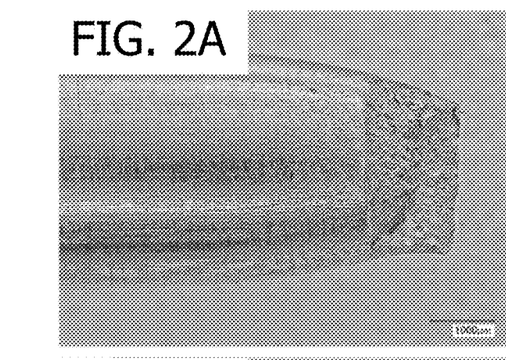
FIG. 2A-2E is a series of optical micrographs of a C1018 carbon steel coupon after SSR testing in the presence of an inert atmosphere (FIG. 2A), carbonate solution (FIG. 2B), carbonate solution and Comparative Formulation A (formulation with corrosion inhibitor only (formula 1)) (FIG. 2C), carbonate solution and Comparative Formulation B (formu- lation with dispersant only (formula 2)) (FIG. 2D), and carbonate solution and the proposed invention (corrosion inhibitor (formula 1) and dispersant (formula 2)) (FIG. 2E).
Figure 2B:
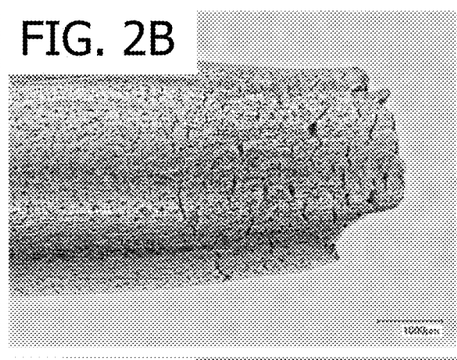
Figure 2C:
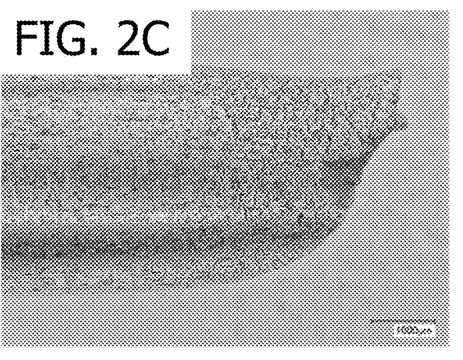
Figure 2D:
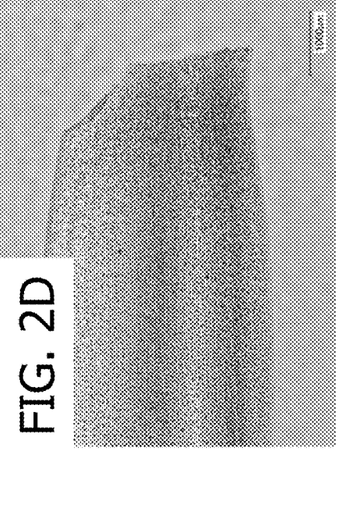
Figure 2E:
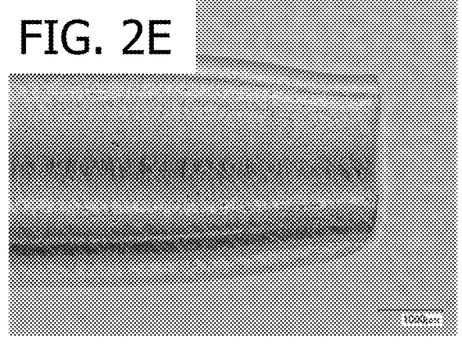

The ductility ratios shown in FIG. 1 were calculated using stress-strain overlay plots of the inert coupon, the carbonate coupon, and the coupon treated with the following formulations: Comparative Formulation A (corrosion inhibitor of Formula 2 only); Comparative Formulation B (dispersant of Formula 1 only); and the Proposed Invention (corrosion inhibitor of Formula 2 and dispersant of Formula 1). The ductility ratios of the $C_{1018}$ carbon steel coupons increased in the presence of all formulations used, compared to the "Blank" coupon (no formulation used). The Proposed Invention, overall, has the highest ratios out of all formulations used.

Optical micrographs of the C1018 carbon steel coupons after SSR testing are shown in FIG. 2; the figure depicts magnified images of the area where failure occurs. Note that only the coupon tested in the presence of the Proposed Invention and the inert environment do not show evidence of SCC or other corrosion features (i.e., pits). All other formulations tested show evidence of cracking (b, and c) and/or pitting (b and d).

The terms "comprise(s)," "include(s)," "having," "has," "can," "contain(s)," and variants thereof, as used herein, are intended to be open-ended transitional phrases, terms, or words that do not preclude the possibility of additional steps or components. The singular forms "a," "and," "the" and "said" include plural references unless the context clearly dictates otherwise. The present disclosure also contemplates other embodiments "comprising," "consisting of" and "consisting essentially of," the embodiments or elements presented herein, whether explicitly set forth or not.

In view of the above, it will be seen that the several objects of the invention are achieved and other advantageous results attained.

As various changes could be made in the above compositions and processes without departing from the scope of the invention, it is intended that all matter contained in the above description shall be interpreted as illustrative and not in a limiting sense.

What is claimed is:

1. A corrosion-inhibiting composition comprising a dispersant having the structure of Formula 1 and a corrosion inhibitor having the structure of Formula 2:

(1)

(2)

wherein $X_1$ is hydroxyl or —OC (O) $R_1$;

$X_2$ is hydroxyl or —OC (O) $R_2$;

$X_3$ is hydroxyl or —OC (O) $R_3$;

$R_1$, $R_2$, and $R_3$ are independently $C_{10}$ to $C_{30}$ alkyl or alkenyl;

m, n, and o are independently integers from 1 to 10;

$R_{20}$, $R_{21}$, $R_{22}$, $R_{23}$, and $R_{24}$ are independently hydrogen or —C (O)—$R_{31}$;

$R_{31}$ is $C_{10}$ to $C_{30}$ alkyl or alkenyl;

p is an integer of 0 or 1;

q is an integer of 1 to 4;

r is an integer of 0 or 1;

s is an integer of 0 or 1;

t is an integer from 1 to 4; and p1, q1, r1, r2, s1, and t1 are independently integers from 1 to 6;

wherein when p, r, and s are 0, q+t is an integer from 4 to 8;

wherein the sum of p, q, r, s, and t results in a compound with five or more amine groups; and wherein at least one of $R_{20}$, $R_{21}$, $R_{22}$, $R_{23}$, and $R_{24}$ is —C(O)—$R_{31}$.

2. The corrosion-inhibiting composition of claim 1, wherein m, n, and o are independently integers from 1 to 8.

3. The corrosion-inhibiting composition of claim 1, wherein $X_1$ is hydroxyl or —OC(O)$R_1$.

4. The corrosion-inhibiting composition of claim 3, wherein $X_1$ is hydroxyl.

5. The corrosion-inhibiting composition of claim 3, wherein $X_1$ is —OC(O)$R_{1—}$.

6. The corrosion-inhibiting composition of claim 5, wherein $R_1$ is $C_{12}$ to $C_{24}$ alkyl or alkenyl.

7. The corrosion-inhibiting composition of claim 1, wherein $X_2$ is hydroxyl or —OC(O)$R_2$.

8. The corrosion-inhibiting composition of claim 7, wherein $X_2$ is hydroxyl.

9. The corrosion-inhibiting composition of claim 7, wherein $X_2$ is —OC(O)$R_2$.

10. The corrosion-inhibiting composition of claim 9, wherein $R_2$ is $C_{12}$ to $C_{24}$ alkyl or alkenyl.

11. The corrosion-inhibiting composition of claim 1, wherein $X_3$ is hydroxyl or —OC(O)$R_3$.

12. The corrosion-inhibiting composition of claim 11, wherein $X_3$ is hydroxyl.

13. The corrosion-inhibiting composition of claim 11, wherein $X_3$ is —OC(O)$R_3$.

14. The corrosion-inhibiting composition of claim 13, wherein $R_3$ is $C_{12}$ to $C_{24}$ alkyl or alkenyl.

15. The corrosion-inhibiting composition of claim 1, wherein the dispersant of Formula 1 has the structure of Formula 1A:

(1A)

16. The corrosion-inhibiting composition of claim 15, wherein p1, q1, r1, r2, s1, and t1 are independently integers from 2 to 6.

17. The corrosion-inhibiting composition of claim 1, wherein the corrosion inhibitor of Formula 2 has the structure of Formula 2A:

(2A)

18. The composition of claim 17, wherein $R_{31}$ is $C_{12}$ to $C_{24}$ alkyl or alkenyl.

19. The corrosion-inhibiting composition of claim 1, further comprising a solvent, wherein the solvent is a hydrocarbon solvent.

* * * * *